W. P. Porter.
Nut Lock.
Nº 90,686.        Patented Jun. 1, 1869.

Witnesses
S Morris Pool
R H Whittlesey

Inventor
W. P. Porter.
By atty A B Stoughton

United States Patent Office.

WILLIAM P. PORTER, OF PITTSBURG, PENNSYLVANIA, ASSIGNOR TO "PITTSBURG FORGE AND IRON COMPANY."

Letters Patent No. 90,685, dated June 1, 1869.

IMPROVEMENT IN NUT-LOCK.

The Schedule referred to in these Letters Patent and making part of the same.

*To all whom it may concern:*

Be it known that I, WILLIAM P. PORTER, of Pittsburg, in the county of Allegheny, and State of Pennsylvania, have invented certain new and useful Improvements in Securing or Preventing Nuts from Turning on their Bolts; and I do hereby declare the following to be a full, clear, and exact description of the same, reference being had to the accompanying drawings, making a part of this specification, in which—

Similar letters of reference, where they occur in the separate figures, denote like parts of the contrivance in all of the drawings.

Figure 1:
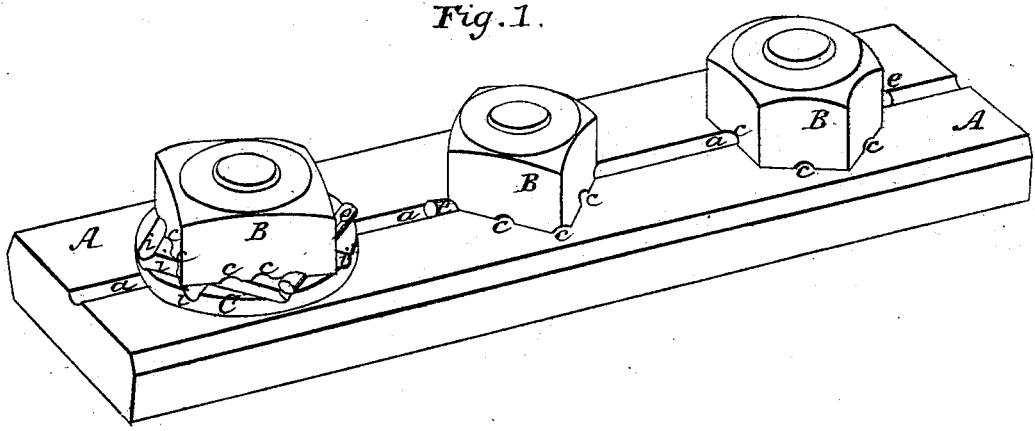
Figure 1 represents, in perspective, three several modifications of my general plan of securing nuts from turning.
Figure 2:
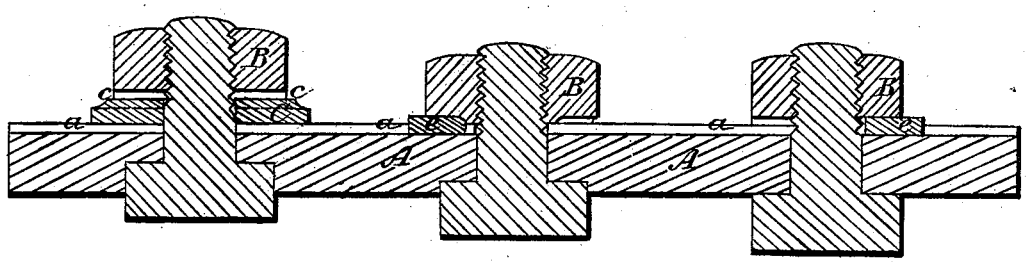
Figure 2 represents a longitudinal section through the same.
Figure 3:
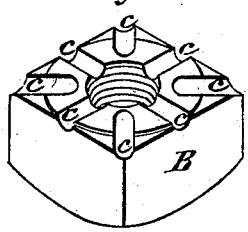
Figure 3 represents, in perspective, a view of the under side of one of the nuts, to show the grooves therein.

I am aware that a groove has been formed in a plate, or other article on which the nut of a screw-bolt is placed, and that a wire, or key has been driven into said groove, and one or both ends of said key afterwards bent up against the nut, or nut and washer, and that said bent end or ends are designed to prevent the nut from turning on the bolt. The bending up of a plate, ring, key, which is the common method of securing nuts, is a troublesome matter, and very much so when, from necessity, the nut has to be run back or off. I lay no claim to any bent-up device for securing nuts, as I do not use any such, but simply a straight key, which is very easily introduced.

My invention consists in using, in connection with a groove, or grooves in the plate, or other thing that the screw-bolt passes through, or is to secure, a groove, or grooves in the underside of the nut, and a key driven into any one of the series of grooves that match or are opposite to each other, and thus prevent the nut from turning, and avoid any necessity of bending up the key or pin.

To enable others skilled in the art to make and use my invention, I will proceed to describe the same with reference to the drawings.

A may represent a plate, rail, splice-piece, or any other article to be bolted to or with any other piece, and where, from sudden jars and strains, the nuts are liable to become loosened, as in railroad-tracks or bridges.

In this piece A there is a groove, $a$, semicircular or otherwise in form, and in line with, or on such part thereof as the bolt or bolts are to pass through, or the nuts rest or be run down against.

The nuts B have upon their under sides one or more similarly-shaped grooves, $c$, and when the nut is run down, and any suitable one of the half grooves in the nut, match, or come in line with one of the half grooves in the plate, or these grooves are made to match, a key, or pin, $e$, is driven in, and permanently prevents the nut from turning, one half of the pin, or key being in the plate, and the other half in the nut. There is no necessity of bending anything, but simply to drive in a nail, pin, or key that is partially in the nut and partially in the plate.

When a washer, C, is used, as is generally the case where the bolt passes through wood, then the top of the washer is grooved, as seen at $i$, with one or more grooves, and when the nut is run down tight upon it, the key, or pin $e$ is driven between the nut and the washer, which holds both from turning. The grooves may or may not extend to the thread of the nut, or opening in the washer.

Having thus fully described my invention,

What I claim therein as new, and desire to secure by Letters Patent, as a device for securing or preventing nuts from turning or becoming loose on their bolts, is—

The slot or slots in the plate, or washer, and the slot or slots in the under side of the nut, and a key, or pin driven into these slots or grooves, when matched or in line, which effectually prevents the nut from turning, and without the necessity of bending up the end or ends of the key, substantially as described.

WM. P. PORTER.

Witnesses:
JAMES VERNER,
JAS. H. MURDOCK.